United States Patent [19]

Landsness

[11] Patent Number: 4,547,251

[45] Date of Patent: Oct. 15, 1985

[54] ADJUSTABLE TIRE BUILDING DRUM

[75] Inventor: Clifford A. Landsness, Akron, Ohio

[73] Assignee: The B. F. Goodrich Company, Akron, Ohio

[21] Appl. No.: 566,609

[22] Filed: Dec. 29, 1983

[51] Int. Cl.⁴ ............................................. B29H 17/16
[52] U.S. Cl. ................................. 156/415; 156/420; 156/133
[58] Field of Search ............... 156/414, 415, 416, 417, 156/418–420, 133, 110.1

[56] References Cited

U.S. PATENT DOCUMENTS

| 3,645,818 | 2/1972 | Frazier | 156/133 |
| 3,787,262 | 1/1974 | Appleby et al. | 156/420 |
| 3,959,064 | 5/1976 | Touchette | 156/420 |
| 4,220,494 | 9/1980 | Kawaida et al. | 156/415 |

FOREIGN PATENT DOCUMENTS

| 51-19871 | 6/1976 | Japan | 156/420 |
| 1194270 | 6/1970 | United Kingdom | 156/420 |

Primary Examiner—Lois E. Boland
Attorney, Agent, or Firm—Harry F. Pepper, Jr.; Philip P. McCann

[57] ABSTRACT

An adjustable tire building drum is disclosed for use during strip winding of OTR tire treads having nine replaceable segments with interfitting fingers extending circumferentially to define a rigid generally cylindrical shell whose diameter and axial length may readily be adjusted for a wide variety of different tire sizes. A unique precision actuating mechanism is provided for adjusting the segments radially including a heavy cantilever link and an associated stabilizing arm for each segment which maintains rigidity even when the segmental shell is expanded 90 to 100 percent.

3 Claims, 6 Drawing Figures

ADJUSTABLE TIRE BUILDING DRUM

BACKGROUND OF THE INVENTION

The invention relates to an adjustable rigid tire building drum used for manufacture of rubber tires of many different sizes.

The tire building drums used for supporting off-the-road (OTR) tires during tread strip winding operations must have high strength and rigidity to provide proper support and must also be collapsible to clear the beads during removal of the tire. It is standard practice to employ a large number of such drums in various lengths and diameters for use in building OTR tires of different sizes. These drums are large and heavy and occupy an enormous amount of space in a tire manufacturing plant. Their size and weight also make it difficult to replace drums on the tread strip winding machine when preparing to make tires of a different size.

Normally the carcasses of the OTR tires have beads with an internal diameter at least 25 percent less than the diameter of the major portion of the carcass being supported by the drum, and this presents a serious problem when removing the tire from a conventional collapsible drum. It often becomes necessary to remove or omit one of the segments of the conventional drum in order to permit such removal. Also the tire is frequently damaged by contact with portions of the collapsed drum as it is removed axially from the drum assembly.

The limitations of the conventional equipment in tire manufacturing plants place undesirable restrictions on the shape of the green OTR tire and limit the radial depth from the bead to the cylindrical external surface of the carcass because of the problems referred to above. The use of conventional collapsible drums have also resulted in tires of inferior quality when segments of the drum have had to be removed.

SUMMARY OF THE INVENTION

The present invention eliminates the problems referred to hereabove by providing a tire building drum with a full range of adjustment in both radial and axial directions. Maximum radial adjustment of the outer shell of the drum is achieved by employing in the shell a series of 9 or more axially elongated rigid replaceable segments with interfitting lateral finger portions which overlap the segments to permit maximum contraction of the segmental shell and, when widely separated, enable the fully expanded drum to provide an excellent rigid support for the tire carcass.

The tire building drum of this invention has precision actuating means for simultaneous radial adjustment of all of the segments including, for each segment, a stabilizing arm, a heavy main cantilever link, and an axially movable carriage having guide plates slidably engaging opposite side faces of the main link. The unique arrangement provides maximum radial adjustment in a precise positive manner to provide remarkable strength and rigidity even when the segmental outer shell of the drum is expanded 90 to 100 percent.

The segments of the drum shell are readily detachable and can quickly be replaced with segments of different length to effect axial adjustment of drum length.

An object of the invention is to provide a high strength rigid tire building drum suitable for manufacture of large OTR tires which may be adjusted in radial and axial directions for making tires of a wide variety of sizes and which provides maximum radial adjustment without loss of rigidity.

BRIEF DESCRIPTION OF THE DRAWINGS

The foregoing and other objects and advantages of my invention will appear more fully from the following description, made in connection with the accompanying drawings of preferred embodiments of the invention, wherein like reference characters refer to the same or similar parts throughout the several views and in which.

DETAILED DESCRIPTION OF PREFERRED EMBODIMENTS

Figure 1:
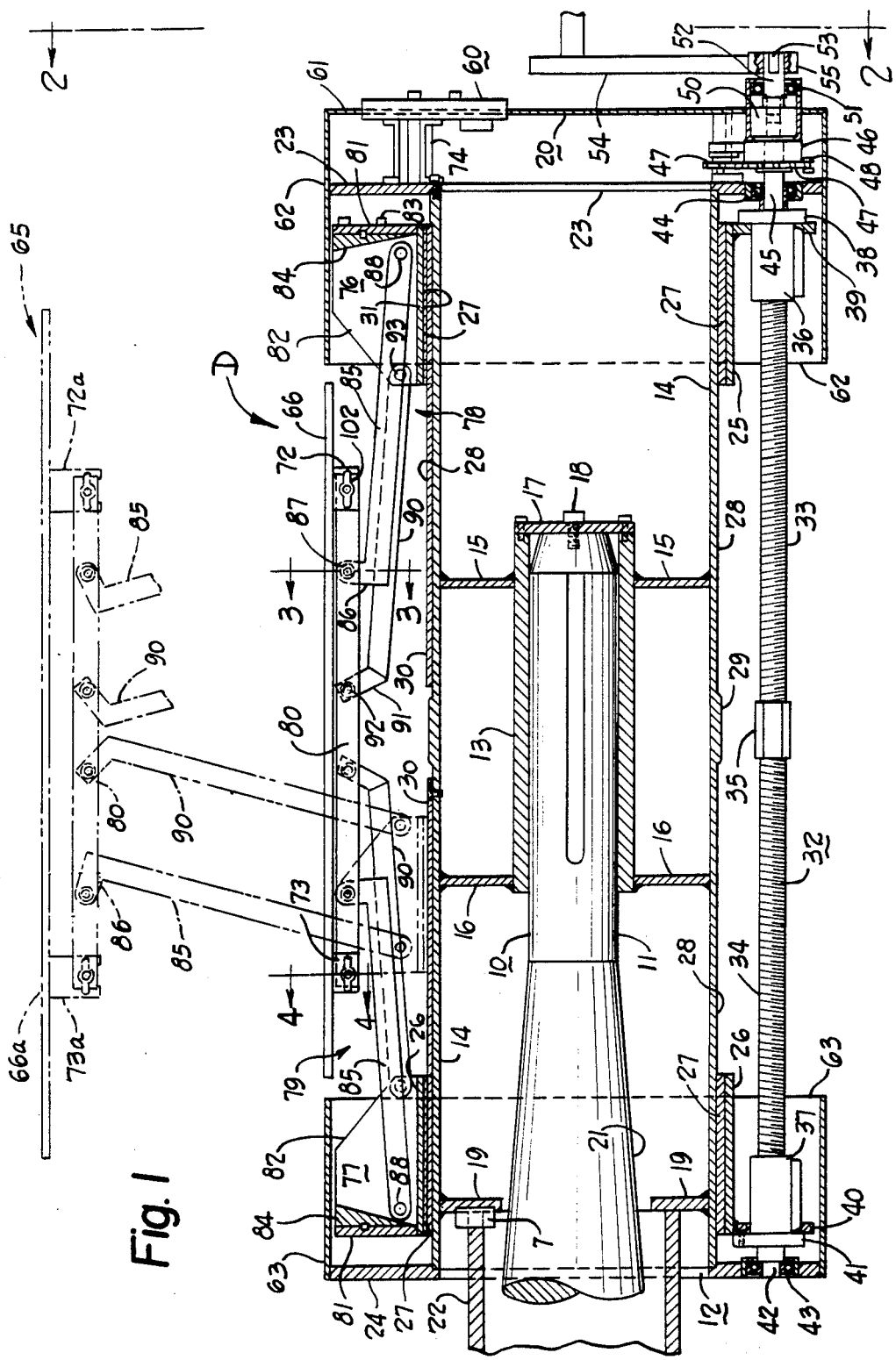
FIG. 1 is a vertical sectional view of a tire building drum according to the invention on a reduced scale with parts omitted and parts shown in broken lines position after adjustment of length and diameters.

Referring more particularly to the drawings, which are drawn substantially to scale, FIGS. 1 to 6 show a preferred tire building drum D according to this invention mounted on a conventional tread winding machine having a motor-driven cantilever shaft 10 with a cylindrical end portion 11 and having a cylindrical quill 22 surrounding the shaft. The drum has a hub assembly 12 including a central tubular member 13 mounted on shaft portion 11, a cylindrical supporting tube 14 coaxial with member 13, and annular supports 15 and 16 extending radially between members 13 and 14 and welded thereto. A flat circular cap 17 is rigidly attached to the tube 13 and held against the end of the shaft 10 by a screw 18.

As shown, a flat annular reinforcing plate 19 is welded to the interior of the tube 14 near the plate 24 and is detachably connected to a hollow shaft or quill 22 by a series of circumferentially spaced keys 7. The cylindrical shaft 22 rotates in unison with the drum D and is used for braking and stopping rotation as is conventional in tread strip winding machines.

The tire building drum has a pair of flat vertical end plates 23 and 24 rigidly mounted on the tube 14 at opposite ends thereof and has a pair of axially movable cylindrical metal sleeves 25 and 26 with associated cylindrical bushings 27 of the same length as the sleeves. The bushings are mounted to slide axially on the machined external cylindrical surfaces 28 of the tube 14 which extend outwardly from the central portion 29. A pair of long narrow keys 30 extend axially the full length of each surface 28 and fit in narrow keyway slots 31 of the bushings 27 to help locate the parts and hold them in their adjusted positions.

Figure 2:
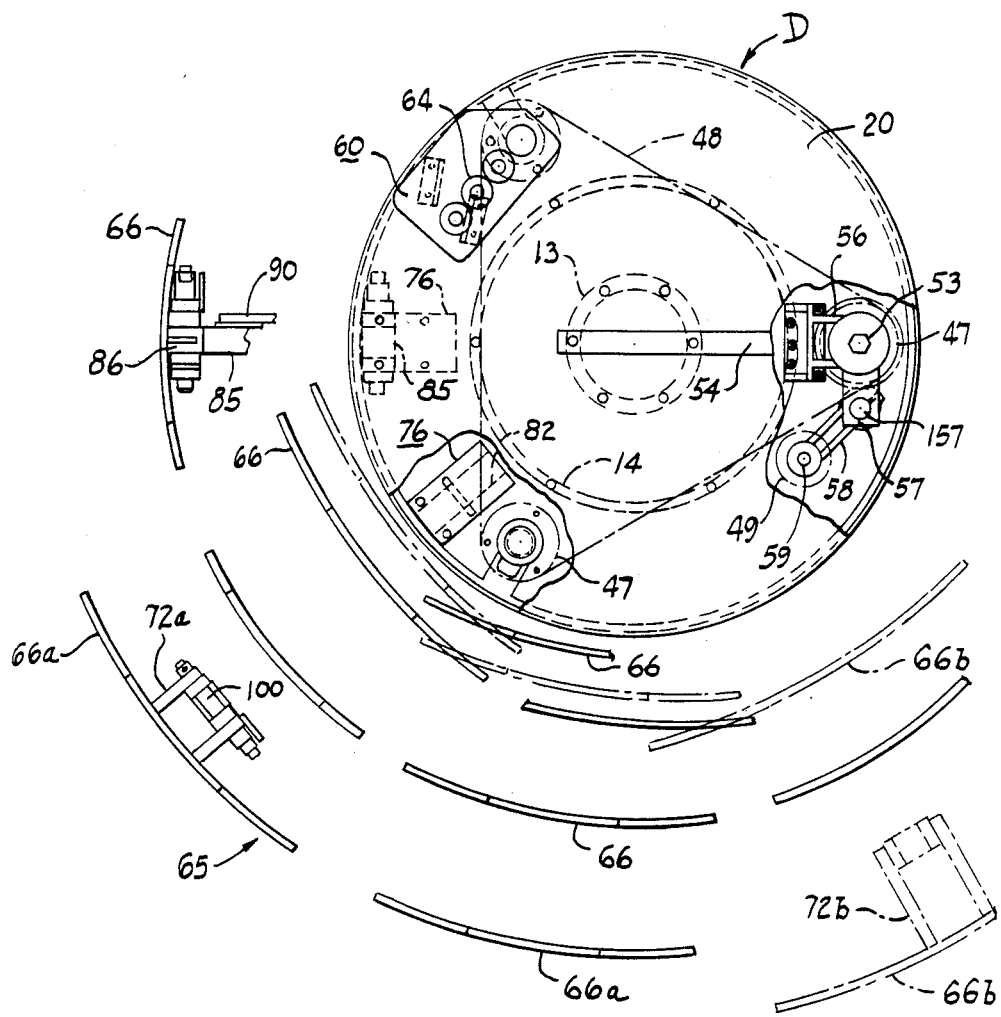
FIG. 2 is an end view looking in the direction of the arrows 2—2 of FIG. 1 with parts omitted and different segments shown in various adjusted positions.
Figure 3:
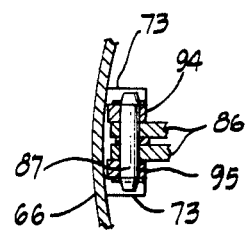
FIG. 3 is a fragmentary sectional view taken on the line 3—3 of FIG. 1.

Means are provided for moving the sleeves 25 and 26 simultaneously toward or away from each other to adjusted positions on the supporting tube 14 including a series of ballscrew actuating means 32 regularly spaced around the circumference of the drum D. As shown three of such devices are provided with a 120° spacing as indicated in FIG. 2. Each actuating means 32 comprises a pair of axially aligned threaded shaft sections 33 and 34 joined by a central collar 35 and a pair of conventional ball nuts 36 and 37 having threaded engagement with the left and right hand threads of the shaft sections 33 and 34, respectively, so that the sleeves 25 and 26 move in unison equal distances in opposite directions in response to rotation of the threaded shafts.

The ball nuts may be rigidly supported on the sleeves 25 and 26 in any suitable manner. As shown a flat end plate 38 associated with the ball nut 36 is rigidly mounted on a flat vertical mounting plate 39 welded to one end of the sleeve 25. A similar arrangement may be provided at the opposite end of the drum. As shown a flat vertical mounting plate 40 carried by the sleeve 26 is rigidly connected to a detachable clamp plate 41 which holds the ball nut 37 in position near the end portion 42 of the shaft 34.

A bearing 43 is located in the end plate 24 to provide a rotatable support for the shaft, and a similar bearing 44 in the end plate 23 provides a rotatable support for the end portion 45 of the shaft 33. A similar arrangement is provided for each of the three actuating means 32, and a hub 46 with a sprocket 47 is mounted on the end portion 45 of each shaft 33 to support an endless link chain 48 which causes the three shafts 33 to rotate in unison and to apply equal axial force to the three plates 39 of the sleeve 25. If desired, a freely rotatable sprocket 49 may be employed to maintain tension in the chain.

Various means may be employed to effect rotation of the shafts 33 and 34 and to obtain the desired axial adjustment of the sleeves 25 and 26. Such adjustment may be effected manually or semi-automatically. As herein shown, manual means are provided for rotating one of the shafts 33 including a conventional double-overrunning clutch 50 having a bearing 51 for rotatably supporting a stub shaft 52. The shaft has a hex-head end portion 53 to receive a hand crank or wrench 54. The hub portion 55 of the crank fits on the end portion 53 so that rotation of the crank causes rotation of the associated shaft 33 and axial adjustment of the sleeves 25 and 26. The clutch may be of a common type, such as a Formsprag reverse-locking clutch, which overruns in both directions of rotation to assure that the parts remain in their adjusted positions between adjustments.

The chain drive assembly preferably includes, in addition to the three sprockets 47, an idler sprocket 49 engaging the outer side of the chain 48. As shown in FIGS. 1 and 2, a supporting bracket 56 is rigidly mounted on the end plate 23 of the drum D and has a laterally projecting plate 57 with a bore that receives a short pivot shaft 157. An adjustable connecting arm 58 is mounted on the pivot shaft and carries a shaft 59 at its outer end which supports the idler sprocket 49 with its axis parallel to the drum axis. The position of the arm 58 may be adjusted to tighten the chain drive.

If desired, means may be provided to indicate the amount of adjustment of the sleeves (or the final diameter of the drum). Such means may, if desired, be a counter mechanism similar to the odometer of an automobile. As herein shown, a counter device 60 is mounted on the plate 23 at the end of the drum and has internal gearing (not shown) which rotates with the sprockets of the chain drive 47-48. The device 60 is held in position by a supporting member 74 and a cup-shaped sheet metal shield 20 and has a series of dials 64 to indicate the amount of adjustment or the number of turns of the hand crank 54 so that the sleeves 25 and 26 can be precisely located by the operator.

The shield 20 has a flat circular vertical portion 61 and a cylindrical portion 62 rigidly connected to the periphery of the circular end plate 23. A similar cylindrical shield 63 is rigidly connected to the end plate 24 and extends axially inwardly in alignment with the portion 62.

The tire building drum of the present invention has a segmental shell 65 of generally cylindrical shape for supporting an annular tire carcass, and such shell is constructed to permit large radial adjustments to change the diameter of the drum in accordance with the adjustment of the sleeves 25 and 26. The shell 65 may be formed of interfitting or interleaved segments which facilitate maximum adjustment and permit contraction of the shell to a minimum diameter. The shell is preferably formed of a series of nine interfitting arcuate segments or leaves of the type shown in FIGS. 5 and 6, such as the segment 66 having a main portion 67 extending axially the full length of the segment and a plurality of closely spaced finger portions 68 and 69 projecting laterally.

Figure 5:
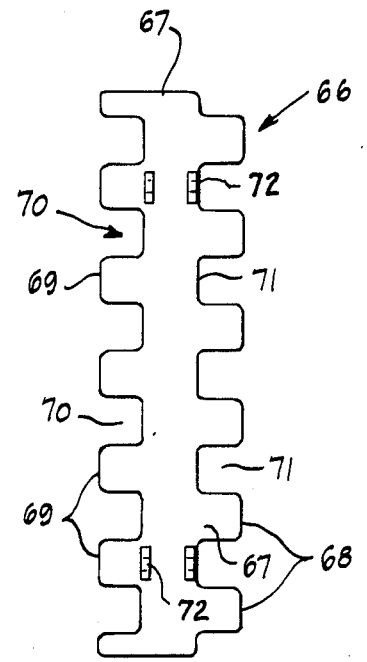
FIG. 5 is a plan view on a reduced scale showing one of the replaceable segments of the drum; and, FIG. 6 is a plan view similar to FIG. 5 showing a segment of larger size.

The finger portions may, for example, be of generally rectangular shape and equally spaced to provide generally rectangular notches 70 and 71 on opposite sides of the intermediate portion 67 as shown in FIG. 5. The notches 70 are of a size to receive the finger portions 68 of an adjacent segment 66, and the notches 71 are offset and of a size to receive the finger portions 69 so that the shell 65 may be collapsed to a position wherein the segments 66 overlap substantially as indicated in broken lines in FIG. 2.

The outwardly projecting fingers 68 and 69 also provide good support for the tire carcass so that the shell 65 functions satisfactorily with maximum expansion even when the outer edges of the fingers of adjacent segments are spaced apart 5 inches or so (i.e., note the radially outermost position of the segments 66a indicated in FIG. 2). It thus becomes possible to provide a rigid tire building drum which may be expanded 90 to 100 percent in diameter.

Figure 6:
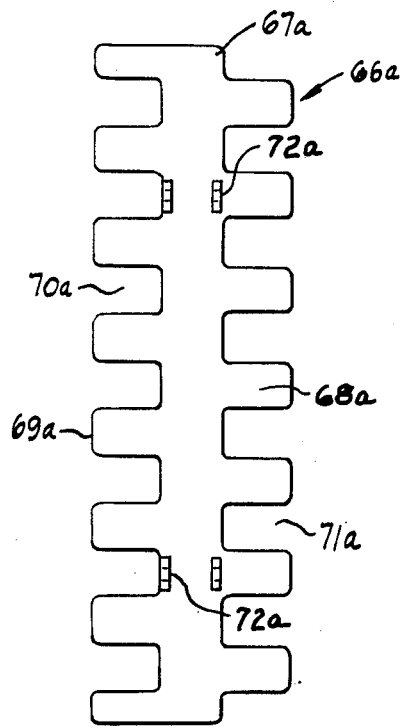

The present invention provides for adjustment of the length of the tire building drum as well as the diameter. Removable means are provided for adjusting the length of the drum according to the size of the tire to be built including replaceable segments of different lengths and widths. FIGS. 5 and 6 show two different sizes, but it will be apparent that many different sizes and shapes may be employed to effect the desired adjustment.

When building a tire of larger size, the segments of FIG. 5 may be replaced with larger segments or leaves 66a of similar shape having corresponding finger portions 68a and 69a on opposite sides of an intermediate portion 67a and corresponding notches 70a and 71a. The replacement segments 66a have an axial length substantially greater than that of the segments 66 and also a substantially greater width. It is thus apparent how the size of the segmental shell 65 may be changed drastically to accommodate many different tire sizes. A single adjustable drum according to this invention is suitable for building OTR tires of many different sizes.

Each of the segments 66 and 66a is preferably provided with detachable mounting means including two spaced pairs of supporting brackets 72 and 73 and is moved radially by a precision actuating mechanism, such as that shown in FIG. 1. As shown, nine segments are provided in the shell 65, each having its own actuating mechanism which moves the segments radially in response to axial movement of the sleeves 25 and 26.

Each actuating mechanism comprises a pair of carriages 76 and 77 rigidly mounted on the sleeves 25 and 26, respectively, and link means 78 and 79 between the carriages and the segment (66 or 66a) for moving the segment radially in response to axial movement of the sleeves or rotation of the threaded shafts 33–34 while holding the segment in a position parallel to the drum axis. The link means 78 extends from the carriage 76 to the supporting means of the segment and is the same as the link means 79 extending from the carriage 77. The carriages may be of identical construction.

As shown, each of the carriages 76 and 77 comprises a vertical end plate 81 rigidly mounted on the axially movable sleeve, a pair of spaced parallel side plates 82 welded to the sleeve (25 or 26) and rigidly connected to the end plate by screws 83, and a triangular spacer block 84 extending laterally between the side plates.

The link means 78 and 79 may extend directly to the supporting brackets of the associated segment 66 (or 66a) but it is preferable to provide a separate horizontal supporting bar 80 to facilitate rapid replacement of the segment. As shown herein, each of the link means 78 and 79 includes a heavy elongated cantilever arm or link 85 having laterally projecting outer end portions 86 pivotally connected to the supporting bar 80 by a pivot pin 87 and having its inner end pivotally connected to the carriage 76 or 77 by a pivot pin 88 extending through the two side plates 82.

Each of said link means is preferably provided with a stabilizing arm 90 having a downwardly inclined outer end portion 91 pivotally connected to the bar 80 by a pivot pin 92 and having its inner end pivotally connected to the inner end of the carriage 76 and 77 by a pivot pin 93. The two arms 90 are in the form of thin bars which assist the two links 85 of each actuating means in holding the segment parallel to the drum axis as indicated in FIGS. 1 and 2.

The actuating means described above for simultaneously adjusting all of the segments provides a unique precision mechanism for changing the drum diameter which permits maximum radial adjustment in a precise manner while maintaining remarkable strength and rigidity when the drum is fully expanded. Such rigidity is maintained by employing heavy cantilever links 85 of rectangular cross section having smooth flat parallel side faces and by employing heavy flat plates 82 on each of the carriages 76 and 77 with smooth flat parallel inner faces perpendicular to the associated pivot pin 88 and parallel to the drum axis for slideably engaging the side faces of the associated cantilever link 85. The inner faces of each pair of plates 82 are spaced apart a distance equal to the thickness of the link 85 to provide a cantilever support or guide to prevent side-to-side movement of the link throughout its pivotal movement and to maintain rigidity in the support at all times. Said timer faces engage the parallel outer faces of the associated link 85 along at least one-fourth of the length of the link when the shell of the drum D is expanded to provide a rigid cantilever support during tire building.

The supporting bar 80 shown herein has spaced parallel rails 94 and 95 for receiving the pivot pins 87 and 92 and has axially aligned bores 96 at each end of said bar for receiving a removable pin 100. The two pins 100 extend through the axially aligned bores 97 of the brackets 72 and 73 to provide a rigid connection between the bar 80 and the associated segment 66 or 66a. The rails are rigidly connected by a plurality of lateral plates 98.

Figure 4:
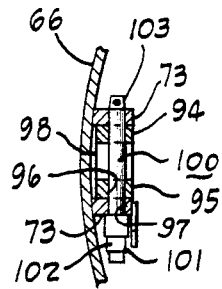
FIG. 4 is a fragmentary sectional view taken on the line 4—4 of FIG. 1.

As indicated in FIG. 4, the two brackets 72 (or 73) near each end of the segment are spaced apart a distance corresponding to the width of the bar 80 so that the bar fits snugly between the brackets. The pin 100 has an enlarged head 101 with laterally projecting gripping portions 102 and a tapered end 103 to facilitate insertion through the bores 96 and 97. If desired, a ball detent or the like may be provided at end 103 to prevent accidental axial movement.

The supporting brackets 72 and 73 of the segments 66 and 66a may be identical and are located to permit alignment of the bores 96 and 97. It will be understood, however, that the larger segments 66a may have brackets 72a and 73a with greater height than the corresponding brackets 72 and 73 to increase the drum diameter when the segments are extended, for example to the position shown in broken lines in FIG. 1.

FIG. 2 indicates the maximum diameter of the segmental shell 65 of the drum D when using segments 66a and indicates how a greater diameter may be obtained using even larger replacement segments 66b with supporting brackets which extend radially a greater distance than the brackets 72a and 73a (i.e., the bracket 72b). The segment 66b may, if desired, have an axial length greater than that of the segment 66a shown in FIG. 6.

The replaceable segments provide a convenient means for adjusting the axial length of the tire building drum. With a drum of the type shown in FIG. 2, the replacement of segments permits an increase in the axial length of the segmental shell 65 from 50 to 60 percent or more. This adjustment together with the adjustment in the diameter makes it possible to build almost all of the commercial OTR tire sizes using the same basic drum to receive the segments. One drum can therefore replace a large number of collapsible drums now being used in a manufacturing plant.

The drum of this invention is particularly well suited for tire building operations wherein the carcass of the tire is supported with the major portion thereof in a generally cylindrical position and a tread is applied to the carcass while rotating the drum. The tread is preferably formed by a conventional strip-winding operation using a narrow rubber strip as described, for example, in *Elastomerics*, Vol. 111, No. 2, February 1979, pages 19–22.

A drum constructed according to the invention can be contracted or collapsed to a relatively small diameter so as not to interfere with axial removal of the tire from the drum even with the smaller OTR tires. In the contracted position shown in FIG. 2, the drum D has an axial length more than twice its diameter. It may be expanded to almost twice that diameter while maintaining its rigidity.

I claim:

1. In a tire building drum having a central hub means mounted for rotation about a horizontal axis, a series of segments mounted on said hub means to form an outer peripheral shell, and actuating means for moving the segments radially to adjust the diameter of the segmental shell, the improvement which comprises:
   (a) at least nine segments regularly spaced around the drum to form an axially elongated generally cylindrical shell, each of said segments comprising an axially elongated member of arcuate cross section having a series of laterally projecting finger portions at opposite sides thereof which interfit with fingers of the next adjacent segment and overlap that segment when the shell is contracted,
(b) a pair of carriages for each segment mounted to move axially on said hub means,
(c) link means for each segment including a pair of rigid cantilever links to move the segment radially and stabilizing means to maintain the segment in a position parallel to the drum axis, each of said cantilever links being pivotally mounted on one of said carriages at one end and pivotally connected to the associated segment at the opposite end so as to swing radially in response to axial movement of said carriage means, and
(d) means for gradually moving the two carriages of each segment toward each other to effect simultaneous movement of all of the segments from retracted positions adjacent said hub means wherein the shell has a minimum diameter to advanced positions wherein said shell has an effective diameter at least 80 percent greater than said minimum diameter.

2. A tire building drum according to claim 1 wherein each of said cantilever links has parallel flat outer side faces and each of said carriages has a pair of rigid guide plates with flat parallel inner side faces maintained in sliding engagement with the outer side faces of the associated link as it moves between its retracted and advanced positions.

3. A tire building drum according to claim 1 wherein each of said segments is detachably connected to a horizontal supporting bar which is pivotally connected to the two cantilever links of the associated link means, and wherein replaceable means are provided for adjusting the axial length of said shell comprising replacement segments of different length adapted to be detachably connected to said supporting bar.

* * * * *